United States Patent [19]
Brewer

[11] Patent Number: 6,089,343
[45] Date of Patent: Jul. 18, 2000

[54] VEHICLE FRAME

[75] Inventor: Clay David Brewer, Willow Spring, N.C.

[73] Assignee: Deere & Company, Moline, Ill.

[21] Appl. No.: 09/316,759

[22] Filed: May 21, 1999

[51] Int. Cl.$^7$ .................................................. B62D 21/00
[52] U.S. Cl. ........................ 180/311; 180/312; 180/291; 280/781
[58] Field of Search .................................. 180/311, 312, 180/291; 280/787

[56] References Cited

U.S. PATENT DOCUMENTS

| | | | |
|---|---|---|---|
| 4,807,904 | 2/1989 | Kamlukin et al. | 280/781 |
| 5,012,885 | 5/1991 | Hilden | 180/312 |
| 5,248,237 | 9/1993 | Nakamura | 180/312 |
| 5,265,690 | 11/1993 | Amundsen et al. | 180/311 |
| 5,327,989 | 7/1994 | Furuhashi et al. | 180/311 |
| 5,459,984 | 10/1995 | Reichen et al. | 56/7 |

OTHER PUBLICATIONS

Kubota Tractor Corporation, Kubota Diesel Front Mower F2000, pp. 1–16, date of publication Dec. 1986, published in Japan.

Jacobsen Textron, The Turfcat II Series, pp. 1–10, date of publication Oct. 1986, published in U.S.A.

Kubota Tractor Corporation, Kubota Diesel Front Mower–F2260/F2560E/F2560/F3060, pp. 1–12, date of publication Feb. 1998, published in Japan.

Toro, Introducing Groundsmaster 3000, pp. 1–4, date of publication 1995, published in U.S.A.

Gravely International, Gravely Promaster Series, pp. 1–16, date of publication Jun. 1995, published in U.S.A.

Toro, Groundsmaster 200 Series, pp. 1–10, date of publication 1994, published in U.S.A.

*Primary Examiner*—Kenneth R. Rice

[57] ABSTRACT

A vehicle frame having first and second sub-assemblies permits the rear axle housing to be mounted above the frame and lowers the center of gravity of the vehicle to improve stability on slopes. Connections at two telescoping joints and a cross bar structure provide for quick and easy assembly or separation of the sub-assemblies so that maintenance and/or exchange of the axle unit can be carried out. A single pivotal connection between the axle unit and rear sub-assembly facilitates rocking movement of the axle unit on uneven ground and simplifies installation or removal of the axle unit.

14 Claims, 8 Drawing Sheets

VEHICLE FRAME

BACKGROUND OF THE INVENTION

1. Field of the Invention

The present invention relates to vehicles such as front mount mowers and more specifically to a vehicle frame comprised of front and rear sub-assemblies that enable the rear axle of the vehicle to be placed above the frame to lower the vehicle's center of gravity and facilitate easier maintenance and/or replacement of the rear axle unit.

2. Description of the Related Art

Present small vehicles used in maintenance and upkeep of lawn and greens areas such as front mount mowers provide a vehicle frame that carries the front and rear axles. Typically, the rear axle units are mounted beneath the frame to allow for assembly and removal of the axle unit when maintenance and/or replacement is necessary. With the placement of the rear axle unit beneath the frame, the frame is carried higher above the ground than if the axle unit were carried above the frame. Since other vehicle components, such as the engine, are supported on the vehicle frame, they too are carried higher above the ground. Accordingly, the location of the center of gravity of the vehicle relative to the ground is determined by the position of these components relative to the ground.

Small vehicles such as front mounted mowers are commonly used under a variety of ground conditions including rolling hills and slopes. When used in these conditions, their stability is dependent upon the distance between the ground and their center of gravity. It would therefore be desirable to provide a vehicle such as a front mount mower having a low center of gravity that would allow its stability on hillsides and slopes to be enhanced.

SUMMARY OF THE INVENTION

Towards this end, there is provided a vehicle frame that permits the rear axle to be mounted above the bottom of the frame. With the frame positioned beneath the axle, the vehicle components including the engine are positioned closer to the ground. In this manner, the center of gravity of the machine is lowered and its stability on hillsides and slopes can be enhanced.

To lower the frame, it is constructed in front and rear sub-assembly units. The rear sub-assembly is provided with a pair of fore and aft extending frame members with the rear axle being installed above those frame members. After the rear axle unit is assembled to the rear frame sub-assembly, it can be removably joined with the front frame sub-assembly.

Since the rear frame sub-assembly can be quickly and easily joined with and/or removed from the front sub-assembly, it and its axle unit can be easily removed to allow maintenance of the axle unit. A single pivotal connection is provided for mounting the axle unit with the rear sub-assembly, thereby allowing it to be quickly and easily removed for maintenance or replacement. The ease of removing the rear sub-assembly also permits the owner to quickly and easily change axle types should they want to exchange a non-driven rear axle for a driven rear axle and convert the vehicle between two and four wheel drive.

With the present invention there is provided a vehicle frame assembly having front and rear sub-assemblies that allow the vehicle's rear axle to be carried above the lower frame member to lower the center of gravity of the vehicle. Further, the rear sub-assembly can be quickly and easily removed to permit maintenance to be carried out on the axle or permit the quick and easy exchange of axle types.

DESCRIPTION OF THE PREFERRED EMBODIMENT

Figure 1:
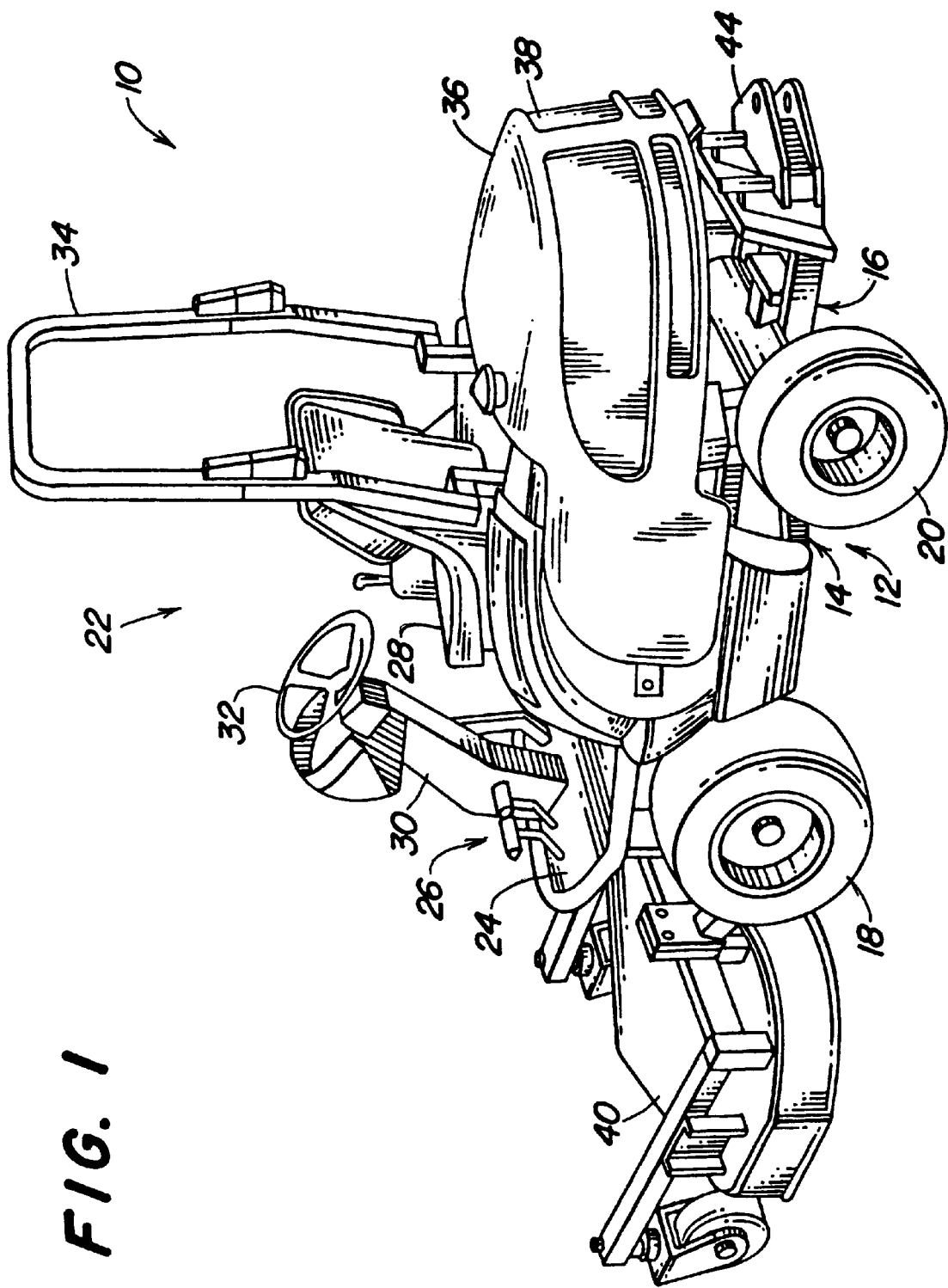
FIG. 1 is a rear elevated perspective view of a front mount mower upon which the front and rear sub-assemblies subject of the present invention can be utilized.
Figure 2:
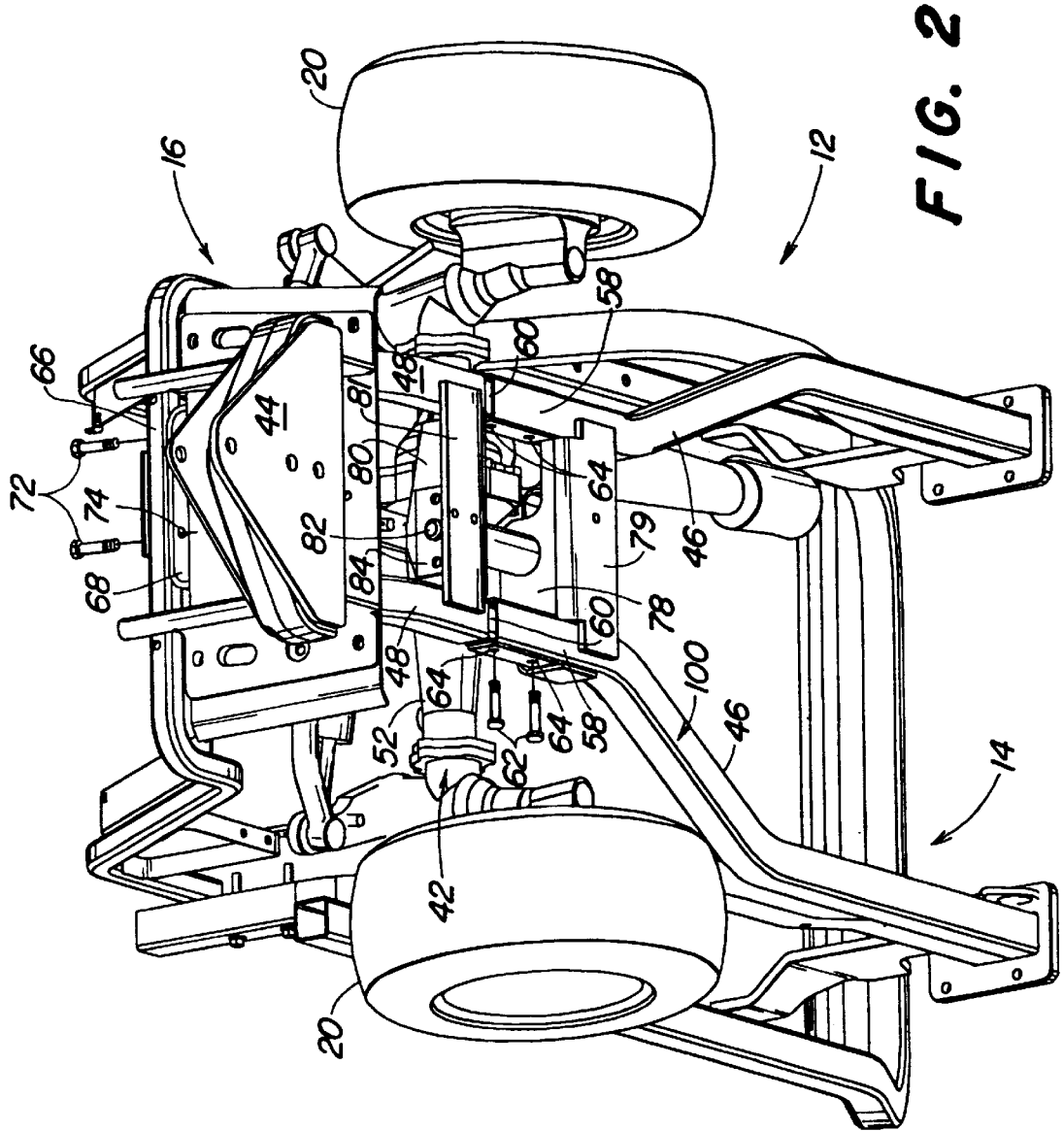
FIG. 2 is a rear perspective schematic view of the underside of the vehicle frame illustrating the two sub-assemblies joined and the axle unit mounted with the rear subassembly.
Figure 3:
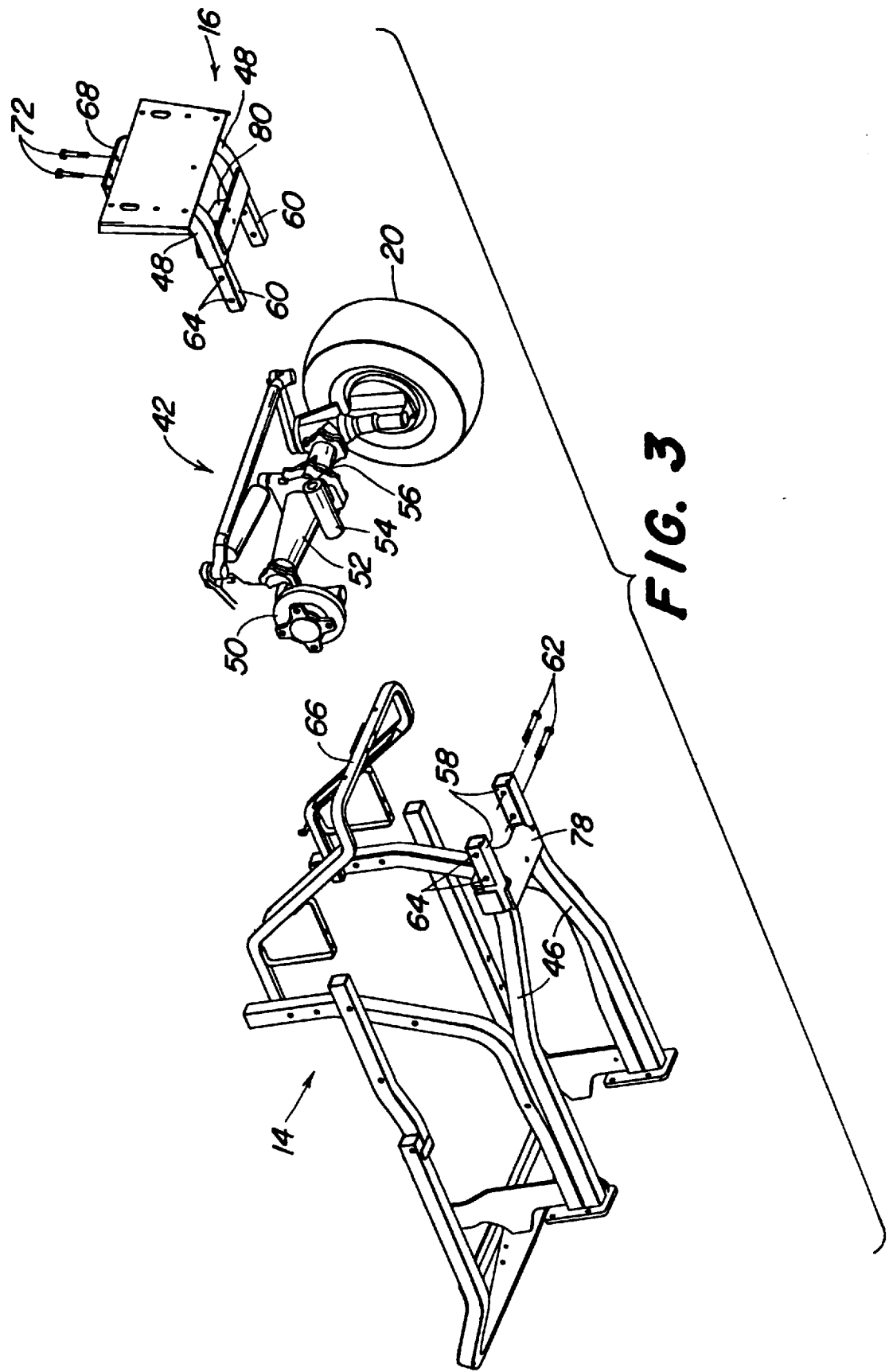
FIG. 3 is an exploded underside perspective view of the two frame sub-assemblies with the rear axle unit removed from the rear sub-assembly.

Looking first to FIG. 1, there is illustrated a rear elevated perspective view of a front mount mower vehicle 10 upon which the present invention is utilized. As illustrated in FIGS. 2 and 3, the vehicle 10 includes a frame 12 comprised of a first or front frame subassembly 14 and a second or rear frame sub-assembly 16. The sub-assemblies 14 and 16 are joined together to support a pair of front drive wheels 18. At the rear of the vehicle frame 12 are carried a pair of steerable wheels 20. The frame 12 further supports an operator station 22 at the forward end of the vehicle 10 having a foot platform 24, foot controls 26 projecting up through the foot platform 24, a seat 28, and an upstanding steering column 30 with a steering wheel 32. Behind the operator station 22 is carried a foldable rollover protection device 34. At the rear of the vehicle 10 is carried a hood 36 that encloses an engine. The hood 36 is provided with cooling and carburetion air inlet screens 38 at each side. Provided at the forward end of the vehicle 10 are lift arms to which a mower deck 40 is attached.

Looking next to FIG. 2, there is illustrated a schematic and rear perspective view of the underside of the vehicle frame 12. In this view, the front frame sub-assembly 14 is joined to the second or rear frame sub-assembly 16 and an axle unit 42 is mounted on the rear sub-assembly 16. The axle unit 42 supports the steerable rear wheels 20 at its outer ends. At the rear of the second frame sub-assembly 16 is provided a hitch structure 44.

Looking as well to FIG. 3, there is shown an exploded view of the two subassemblies 14 and 16 with the axle unit 42. The front or first frame sub-assembly 14 includes a pair of fore and aft extending and laterally spaced apart first frame members 46 which are adapted to support the front drive wheels 18 illustrated in FIG. 1. They are also adapted to support the vehicle engine above them.

The rear frame sub-assembly 16 includes a pair of fore and aft extending and laterally spaced apart second frame members 48 which are adapted to support the axle unit 42. To better illustrate the axle unit 42, the left rear wheel 20 is removed from its hub 50. The axle unit 42 as shown in FIG. 3 includes a cast axle housing 52 that extends laterally. A mounting sleeve 54 is cast as part of the housing 52. The sleeve 54 has an opening 56 extending fore and aft therethrough, which serves to mount the axle housing 42 for rocking movement on the rear sub-assembly 16.

Figure 4:
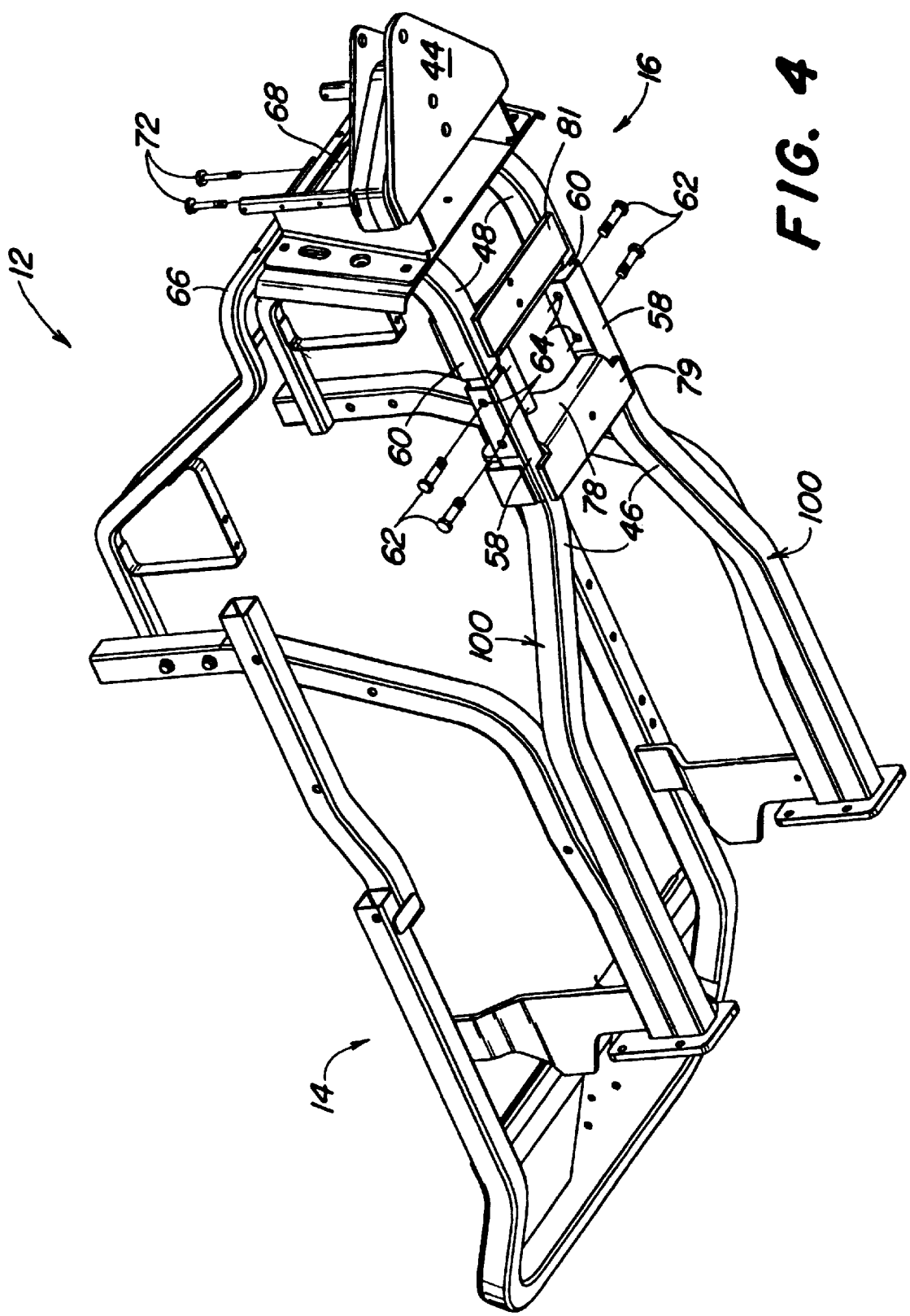
FIG. 4 is a rear perspective schematic view of the vehicle frame similar to that illustrated in FIG. 2, but with the axle unit removed.
Figure 5:
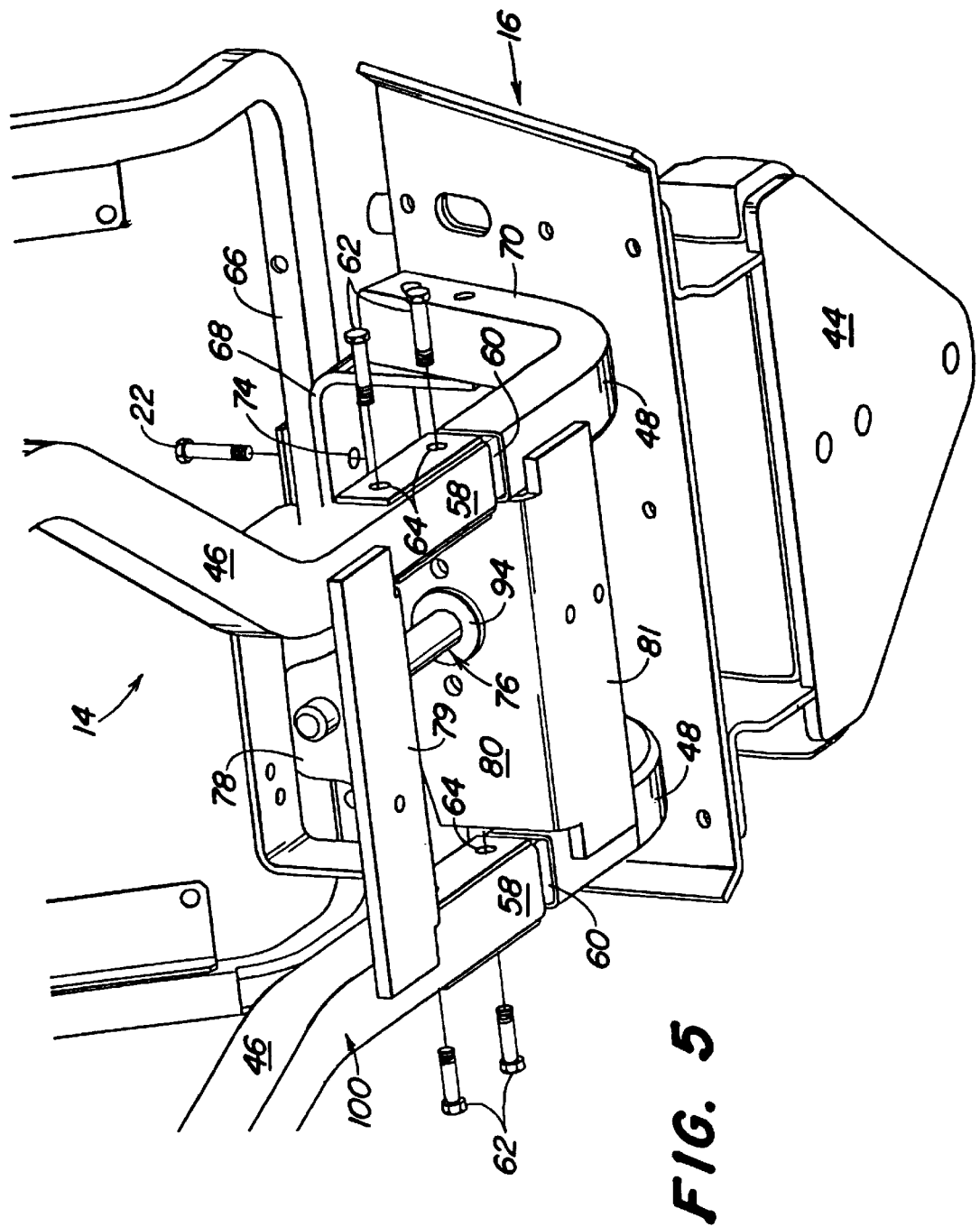
FIG. 5 is an enlarged schematic perspective view illustrating the telescoping frame members that join the two sub-assemblies and the pin member upon which the axle unit is mounted to the rear sub-assembly.

In the preferred embodiment, the first and second frame members 46 and 48 are provided with tubular cross sections. At their rearwardly ends, the first frame members 46 have telescoping outer frame end portions 58. At the forward ends of the second frame members 48 of the rear sub-assembly 16 are provided telescoping inner end portions 60 that can be removably received within the telescoping outer end portions 58 of the front or first frame members 46. As illustrated in FIGS. 2, 4 and 5, the telescoping inner end portions 60 are receivable within the telescoping outer end portions 58 so that bolts or similar fastening means 62 can be inserted through openings 64 provided in the respective outer and inner end portions 58 and 60 to secure them together.

To secure the top portion of the rear sub-assembly 16 with the front sub-assembly 14, there is provided a cross member 66 on the front sub-assembly 14 and a cross bar 68 on the rear sub-assembly 16, see FIGS. 2, 3 and 5. The cross bar 68 is secured to upstanding extensions 70 of the fore and aft extending second frame members 48, see FIG. 5, while the cross member 66 on the rear of the first frame sub-assembly 14 extends transversely at the rear end thereof. When the first and second sub-assemblies 14 and 16 are to be joined, the cross bar 68 is positioned adjacent to the cross member 66, see FIGS. 2, 4 and 5, and bolts or similar fastening means 72 are inserted through the openings 74 in the cross member 66 and cross bar 68 to secure them together. In this manner, only six bolt fasteners are required to secure the two sub-assemblies 14 and 16 together.

Figure 6:
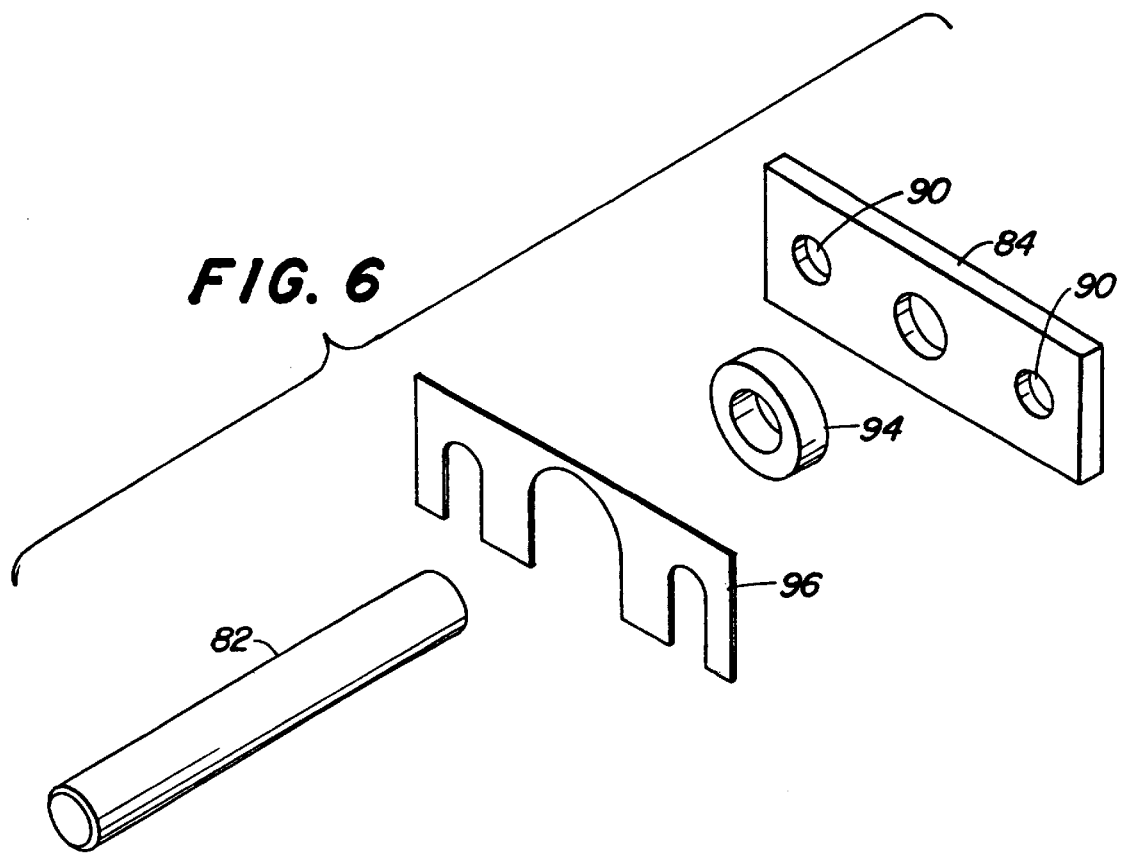
FIG. 6 is an enlarged and exploded view of the pin member and related structure on which the rear axle unit is joined with the rear sub-assembly.
Figure 7:
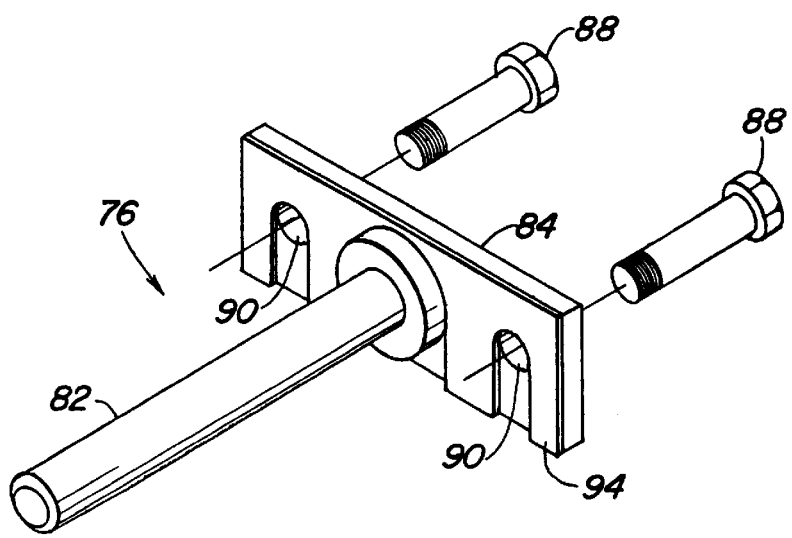
FIG. 7 is a perspective view of the pin member and related structure shown in FIG. 6, but in an assembled configuration.
Figure 8:
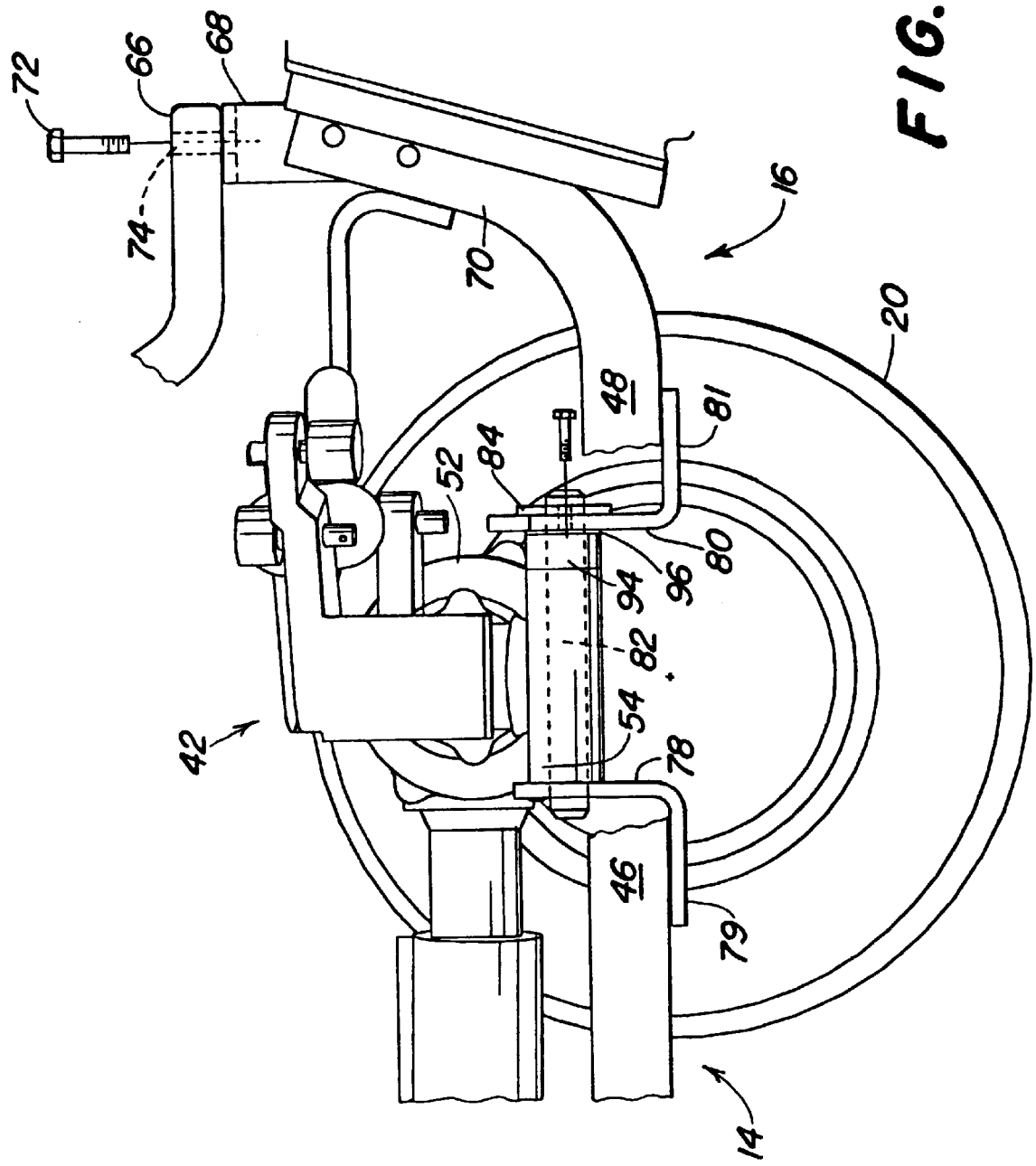
FIG. 8 is a side view of the sleeve and pin member mounting arrangement that secures the axle unit with the two frame sub-assemblies.
Figure 9:
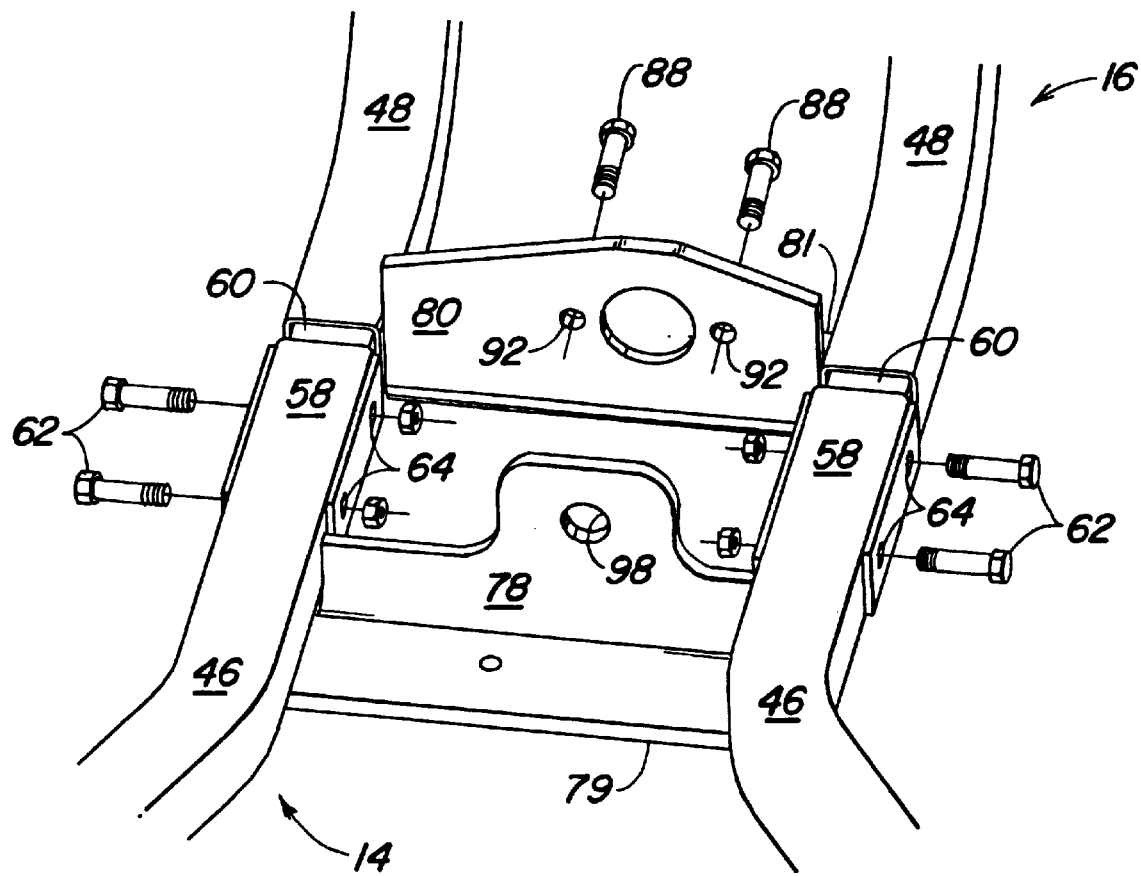
FIG. 9 is an enlarged front perspective view of the mounting plates on which the pin member is supported.

Looking now to FIGS. 2, 5, 6, 7, 8 and 9, there is illustrated the structure which removably secures the axle unit 42 to the rear sub-assembly 16. This structure includes the sleeve 54 fixed with the axle unit 42, the pin member 76, and the mounting plates 78 and 80 carried on the first and second sub-assemblies 14 and 16. Each of these mounting plates 78 and 80 are generally L-shaped and include lower surfaces 79 and 81 respectively which are secured to the lower surfaces 100 of the vehicle frame 12. The pin member 76, as shown in FIG. 6, is comprised of a pin 82 that is secured by welding or similar means to a pin plate 84, see FIG. 7. After it has been secured to the pin plate 84, the pin 82 is inserted into the opening 86 of the rear mounting plate 80, see FIGS. 5 and 9, and bolts or similar fastening means 84 are inserted through the openings 90 and 92 in the pin plate 84 and rear mounting plate 80 respectively to loosely secure the pin member 76 to the mounting plate 80. A support spacer 94, see FIGS. 6, 7 and 8, is then slid over the pin 82 and into the opening 86 in the rear mounting plate 80 to center and support the pin 82 within the opening 86. A shim 96 is then inserted between the pin plate 84 and the mounting plate 80 to accommodate manufacturing variations. The bolts 88 are then tightened to secure the pin member 76 to the rear mounting plate 80. Next, the sleeve 54 which is attached to the axle unit 42 is slid over the pin 82 to mount the axle unit 42 to the rear sub-assembly 16. The rear sub-assembly 16 is then joined to the front sub-assembly 14 by inserting the telescoping inner end portions 60 of the rear sub-assembly 16 into the telescoping outer end portions 58 of the front sub-assembly 14 and the forward end of the pin member 76 is inserted into the support opening 98 of the front mounting plate 78. Then the bolts or similar fastening means 62 are inserted into the openings 64 of the telescoping inner and outer end portions 60 and 58 to secure them together. Similarly, the cross member 66 and cross bar 68 are joined with bolts or similar fastening members 72 to secure the upper portion of the rear sub-assembly 16 with the first sub-assembly 14.

With the bolts securing the first and second frame members 46 and 48 together and the cross member 66 to the cross bar 68, the pin member 76 is supported by the rear and front mounting plates 80 and 78, see FIG. 5. The loose fit between the sleeve 54 and pin 82 allow the axle unit 42 to rock about the pin 82 as ground contour changes are encountered on opposite sides of the vehicle 10.

Removal of the rear sub-assembly 16 from the front sub-assembly 14 is easily accomplished through removal of the four bolts 62 securing the end portions 58 and 60 together and the two bolts 72 securing the cross bar 68 to the cross member 66. The axle unit 42 can then easily be removed from the rear sub-assembly 16 by sliding the sleeve 54 off the pin 82.

With the rear axle unit 42 being secured above the frame 12, none of the vehicle components project below the lower horizontal fore and aft extending surfaces 100 of the frame 12. Accordingly, these surfaces 100 can serve as a support to allow the vehicle to be raised by a fork-lift or similar vehicle. This capability can make the performance of repairs and/or maintenance simpler and require less equipment as well as be of particular value when maintenance or repairs must be carried out in the field. The clean underside surface 100 of the frame 12, in combination with the lower flat and generally horizontal surfaces 79 and 81 of the mounting plates 78 and 80, further serve as skid-plates to protect the vehicle components from damage by obstacles encountered by the underside of the vehicle.

With the present invention, a two part frame sub-assembly is provided that permits the center of gravity of the vehicle to be lowered and its stability on slopes to be enhanced. Further, the small number of structural connections, i.e. six bolts, that must be installed or removed to attach or remove the rear sub-assembly from the front sub-assembly makes repairs and/or replacement of the axle unit a quick and easy process. The clean underside frame surfaces permit the vehicle to be quickly raised for maintenance and/or repair while also protecting the vehicle components from obstacles passing beneath it.

What is claimed is:

1. A vehicle having
   a first sub-assembly with a pair of fore and aft extending and laterally spaced apart first frame members adapted to support a pair of wheels, an operator station and an engine thereabove;
   a second sub-assembly with a pair of fore and aft extending and laterally spaced apart second frame members adapted to be removably joined to respective ones of the first frame members, and
   a transversely extending axle unit removably supported on and above the second frame members.

2. A vehicle having
   a first sub-assembly with a pair of fore and aft extending and laterally spaced apart first frame members adapted to support a pair of wheels, an operator station and an engine thereabove;

a second sub-assembly with a pair of fore and aft extending and laterally spaced apart second frame members adapted to be removably joined to respective ones of the first frame members, and a transversely extending axle section mounted to and above the second frame members for rocking movement about a generally fore and aft extending axis.

3. The invention defined in claim 2 wherein a sleeve having a fore and aft extending opening is secured to the axle unit with the opening being removably receivable on a pin member carried on the second sub-assembly.

4. The invention defined in claim 3 wherein the axle unit includes a housing and the sleeve is formed as a part of the housing.

5. The invention defined in claim 3 wherein the pin member has first and second end portions with one portion being supported by the second sub-assembly and the other end portion being supportable by the first sub-assembly.

6. The invention defined in claim 5 wherein front and rear mounting plates are carried respectively on the first and second sub-assemblies and the first and second end portions are respectively supported by the front and rear sub-assemblies.

7. The invention defined in claim 6 wherein the front and rear mounting plates each include a substantially flat portion secured to the undersides of the first and second subassemblies.

8. A vehicle having a first sub-assembly with a pair of fore and aft extending and laterally spaced apart first frame members adapted to support a pair of wheels, an operator station, and an engine thereabove;

a second sub-assembly with a pair of fore and aft extending and laterally spaced apart second frame members having means permitting them to be telescopically joined to respective ones of the first frame members, and a transversely extending axle unit removably supported on and above the second frame members.

9. The invention defined in claim 8 wherein the underside surfaces of the first and second frame members are substantially flat and extend generally horizontally.

10. The invention defined in claim 8 wherein the second frame members are telescopically receivable within respective ones of the first frame members.

11. The invention defined in claim 10 wherein the first and second frame members are formed in a tubular configuration.

12. The invention defined in claim 10 wherein bolt fasteners secure respective pairs of first and second frame members together.

13. The invention defined in claim 8 wherein the first frame members support a cross bar vertically spaced above them with the cross bar being releasably securable to the second sub-assembly.

14. The invention defined in claim 13 wherein a cross member is carried on the second sub-assembly for being releasably secured to the cross bar.

* * * * *